US012096177B2

(12) United States Patent
Wang et al.

(10) Patent No.: US 12,096,177 B2
(45) Date of Patent: Sep. 17, 2024

(54) SPEAKER AND PORTABLE TERMINAL

(71) Applicant: GOERTEK INC., Weifang (CN)

(72) Inventors: Xinglong Wang, Weifang (CN); Huawei Liu, Weifang (CN); Lianshan Ge, Weifang (CN); Chunfa Liu, Weifang (CN)

(73) Assignee: GOERTEK INC., Weifang (CN)

(*) Notice: Subject to any disclaimer, the term of this patent is extended or adjusted under 35 U.S.C. 154(b) by 830 days.

(21) Appl. No.: 17/256,615

(22) PCT Filed: Oct. 24, 2018

(86) PCT No.: PCT/CN2018/111647

§ 371 (c)(1),
(2) Date: Aug. 5, 2021

(87) PCT Pub. No.: WO2020/000809

PCT Pub. Date: Jan. 2, 2020

(65) Prior Publication Data

US 2022/0078544 A1 Mar. 10, 2022

(30) Foreign Application Priority Data

Jun. 25, 2018 (CN) ......................... 201810663660.6

(51) Int. Cl.
*H04R 1/28* (2006.01)
*H04R 9/04* (2006.01)

(52) U.S. Cl.
CPC ......... *H04R 1/2811* (2013.01); *H04R 1/2834* (2013.01); *H04R 1/2896* (2013.01); *H04R 9/045* (2013.01); *H04R 2499/13* (2013.01)

(58) Field of Classification Search
CPC .......... H04R 1/24; H04R 1/283; H04R 1/323; H04R 1/2811; H04R 1/2834;
(Continued)

(56) References Cited

U.S. PATENT DOCUMENTS 6,963,651 B2 * 11/2005 Peng ........................ H04R 1/24 381/186
7,106,878 B2 * 9/2006 Saiki ...................... H04R 9/045 381/396
(Continued)

FOREIGN PATENT DOCUMENTS

CN 2485745 Y 4/2002
CN 203193868 U 9/2013
(Continued)

OTHER PUBLICATIONS

Machine Translation of DE-102014218427-A1 Description. Inventor: Beyer (Year: 2016).*
(Continued)

*Primary Examiner* — Forrest M Phillips
*Assistant Examiner* — Jennifer B. Olson

(57) ABSTRACT

Disclosed are a speaker and a portable terminal, where the speaker includes: an active vibrating unit, including a first vibrating diaphragm vibrating for radiating a sound, and a voice coil assembly for fixing and driving the first vibrating diaphragm; a passive vibrating unit, including a second vibrating diaphragm and driven by the active vibrating unit to vibrate; and a magnetic circuit system, acting with the voice coil assembly to drive the first vibrating diaphragm of the active vibrating unit to vibrate, where the magnetic circuit system is arranged between the first vibrating diaphragm and the second vibrating diaphragm, a first acoustic cavity is defined between the magnetic circuit system and the first vibrating diaphragm, and a second acoustic cavity is defined between the magnetic circuit system and the second vibrating diaphragm.

7 Claims, 10 Drawing Sheets

(58) Field of Classification Search
CPC .......... H04R 1/2896; H04R 7/04; H04R 7/16; H04R 9/02; H04R 9/025; H04R 9/027; H04R 9/045; H04R 9/06; H04R 2400/11; H04R 2499/11; H04R 2499/13
USPC .......................................................... 181/199
See application file for complete search history.

(56) References Cited

U.S. PATENT DOCUMENTS

| | | | | |
|---|---|---|---|---|
| 7,454,025 | B2 * | 11/2008 | Saiki | H04R 1/2819 381/349 |
| 10,277,986 | B2 * | 4/2019 | Li | H04R 7/12 |
| 2014/0169593 | A1 * | 6/2014 | Kwon | H04R 9/043 381/185 |
| 2019/0191239 | A1 * | 6/2019 | Seo | H04R 1/24 |

FOREIGN PATENT DOCUMENTS

| | | | | |
|---|---|---|---|---|
| CN | 104811875 | A | 7/2015 | |
| CN | 104822114 | A | 8/2015 | |
| CN | 105681984 | A | 6/2016 | |
| CN | 105704626 | A | 6/2016 | |
| CN | 205283802 | U | 6/2016 | |
| CN | 106231508 | A | 12/2016 | |
| CN | 205793302 | U | 12/2016 | |
| CN | 206118014 | U | 4/2017 | |
| CN | 106817659 | A | 6/2017 | |
| CN | 108810761 | A | 11/2018 | |
| CN | 208479943 | U | 2/2019 | |
| DE | 102014218427 | A1 * | 3/2016 | H04R 1/26 |
| FR | 2931334 | A1 | 11/2009 | |
| WO | 2008/004272 | A1 | 1/2008 | |

OTHER PUBLICATIONS

International Search Report mailed Mar. 26, 2019; PCT/CN2018/111647.
The First Chinese Office Action dated Nov. 14, 2023; Appln. No. 201810663660.6.
The Second Chinese Office Action dated May 30, 2024; Appln. No. 201810663660.6.

* cited by examiner

SPEAKER AND PORTABLE TERMINAL

TECHNICAL FIELD

The present disclosure relates to the field of electroacoustic technology, in particular to a speaker and a portable terminal.

BACKGROUND

At present, the speaker has been widely used as an important component of a terminal with audio playback function. Some terminals, especially portable terminals, such as mobile phones, tablet computers, and earphones, can provide very limited installation space for speakers. Therefore, existing speakers that can be applied to a small installation space usually adopt a structure where a single diaphragm produces sound in the front. In order to achieve bidirectional sounding, the prior art provides a speaker using two sets of voice coil and diaphragm combined structure and magnetic circuit system. The magnetic circuit system has double magnetic gaps for accommodating two voice coils. Such speakers are usually large in size and difficult to be widely used. Moreover, in the prior art structure, one set of voice coil and diaphragm combined structure and another set of voice coil and diaphragm combined structure work independently, one set is used as a high frequency speaker, and the other set is used as a low frequency speaker, and simultaneous bidirectional sounding cannot be achieved.

SUMMARY

The main object of the present disclosure is to provide a speaker, which aims to solve the technical problem that the existing speakers that realize bidirectional sound generation are difficult to be widely used due to their large size.

In order to achieve the above object, the speaker provided by the present disclosure includes:

an active vibrating unit, including a first vibrating diaphragm vibrating for radiating a sound, and a voice coil assembly for fixing and driving the first vibrating diaphragm; a passive vibrating unit, including a second vibrating diaphragm and driven by the active vibrating unit to vibrate; and a magnetic circuit system, acting with the voice coil assembly to drive the first vibrating diaphragm of the active vibrating unit to vibrate, where the magnetic circuit system is arranged between the first vibrating diaphragm and the second vibrating diaphragm, a first acoustic cavity is defined between the magnetic circuit system and the first vibrating diaphragm, and a second acoustic cavity is defined between the magnetic circuit system and the second vibrating diaphragm.

Preferably, the first vibrating diaphragm and the second vibrating diaphragm are arranged oppositely and in parallel; and the active vibrating unit and the passive vibrating unit are vibrated synchronously and in a same direction.

Preferably, the magnetic circuit system defines an air guide hole communicating the first acoustic cavity and the second acoustic cavity; the air guide hole is configured for maintaining a pressure balance in the first acoustic cavity, the second acoustic cavity, and the air guide hole, and a pressure change is generated during a vibration of the first vibrating diaphragm to drive the second vibrating diaphragm to vibrate.

Preferably, the magnetic circuit system defines an air guide hole communicating the first acoustic cavity and the second acoustic cavity; and the magnetic circuit system further includes a transmission structure, and a vibration is transmitted by the active vibrating unit to the passive vibrating unit through the transmission structure.

Preferably, the transmission structure is a connector arranged in the air guide hole, an upper end of the connector is fixedly connected to the first vibrating diaphragm or the voice coil assembly, and a lower end of the connector is fixedly connected to the second vibrating diaphragm.

Preferably, the connector is in a shape of a hollow cylinder and is provided with upper and lower openings, an upper end surface of the connector is fixedly connected to the first vibrating diaphragm, and a lower end surface of the connector is fixedly connected to the second vibrating diaphragm.

Preferably, the magnetic circuit system includes two oppositely arranged long sides and two oppositely arranged short sides, and defines one air guide hole at a position corresponding to each short side respectively; and the transmission structure is the connector, one end of the connector is fixedly connected to the voice coil assembly, and the other end of the connector is movably passed through the air guide hole to be fixedly connected to the second vibrating diaphragm.

Preferably, the connector includes an upper connecting portion and a lower connecting portion oppositely arranged up and down, and a support portion connected between the upper connecting portion and the lower connecting portion, where the upper connecting portion and the lower connecting portion are both extended up and down and are both in a long strip shape, the upper connecting portion is fixedly connected to the voice coil assembly, and the lower connecting portion is fixedly connected to the second vibrating diaphragm.

Preferably, the magnetic circuit system includes two oppositely arranged long sides and two oppositely arranged short sides, and defines one air guide hole at a position corresponding to each short side respectively; and the active vibrating unit comprises a bobbin voice coil comprising a bobbin and a voice coil body formed by winding a voice coil lead on the bobbin, one end of the bobbin is fixedly connected to the first vibrating diaphragm, and an end of the bobbin far away from the first vibrating diaphragm is movably passed through the air guide hole to be fixedly connected to the second vibrating diaphragm; and the connector is the bobbin, and the bobbin is passed through the air guide hole to be fixedly connected to the first vibrating diaphragm and the second vibrating diaphragm.

Preferably, the transmission structure is arranged on the vibrating unit, and the first vibrating diaphragm or the voice coil assembly of the active vibrating unit is rigidly connected to the second vibrating diaphragm of the passive vibrating unit.

Preferably, the first vibrating diaphragm includes a first central portion; the second vibrating diaphragm includes a second central portion; and the first central portion includes a first protrusion extending into the air guide hole, the second central portion includes a second protrusion extending into the air guide hole, and the first protrusion and the second protrusion are fixedly connected in the air guide hole.

Preferably, the magnetic circuit system defines the air guide hole at a position corresponding to the voice coil assembly, the second vibrating diaphragm includes a central portion, and the central portion includes an extension portion extending toward the voice coil assembly; and the extension portion is passed through the air guide hole to be fixed to the voice coil assembly.

Preferably, the second vibrating diaphragm includes a central portion; the central portion includes an extension portion extending in a direction close to the first vibrating diaphragm, and the magnetic circuit system defines the air guide hole at a position corresponding to the extension portion; and the extension portion is passed through the air guide hole to be fixed to the first vibrating diaphragm.

The present disclosure further provides a portable terminal, where a housing of the portable terminal defines two sound holes corresponding to sound radiation areas of the first vibrating diaphragm and the second vibrating diaphragm of the speaker.

Preferably, the housing includes a front and a back arranged oppositely, a first sound hole is defined on the front of the housing, and a second sound hole is defined on the back of the housing; a space where the first vibrating diaphragm away from the second vibrating diaphragm is communicated with the first sound hole, and the first sound hole is configured for conducting a sound emitted by the first vibrating diaphragm; a space where the second vibrating diaphragm away from the first vibrating diaphragm is communicated with the second sound hole, and the second sound hole is configured for conducting a sound emitted by the second vibrating diaphragm.

The speaker provided by the present disclosure is provided with two sets of vibration systems, but only one set of voice coil and magnetic circuit system is adopted to realize the bidirectional sounding structure, which occupies a small volume and is convenient to be widely used in portable terminals. When the speaker of the present disclosure works, the magnetic circuit system directly drives the diaphragm of the active vibrating unit, so that the air in the first acoustic cavity is compressed or expanded, because the first acoustic cavity and the second acoustic cavity are communicated through the air guide hole or through the air guide hole and the transmission structure, so that a bidirectional sounding structure can be formed, in which the first vibrating diaphragm radiates actively and the second vibrating diaphragm is driven by the first vibrating diaphragm to radiate passively, and the first vibrating diaphragm and the second vibrating diaphragm vibrate at the same time to achieve bidirectional sounding at the same time. When applied to a portable terminal, the speaker of the present disclosure can respectively emit sound in the front and back directions of the portable terminal through the active vibrating unit and the passive vibrating unit.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are merely some embodiments of the present disclosure. For those of ordinary skill in the art, other drawings can be obtained based on the structure shown in these drawings without paying creative work.

Figure 1:
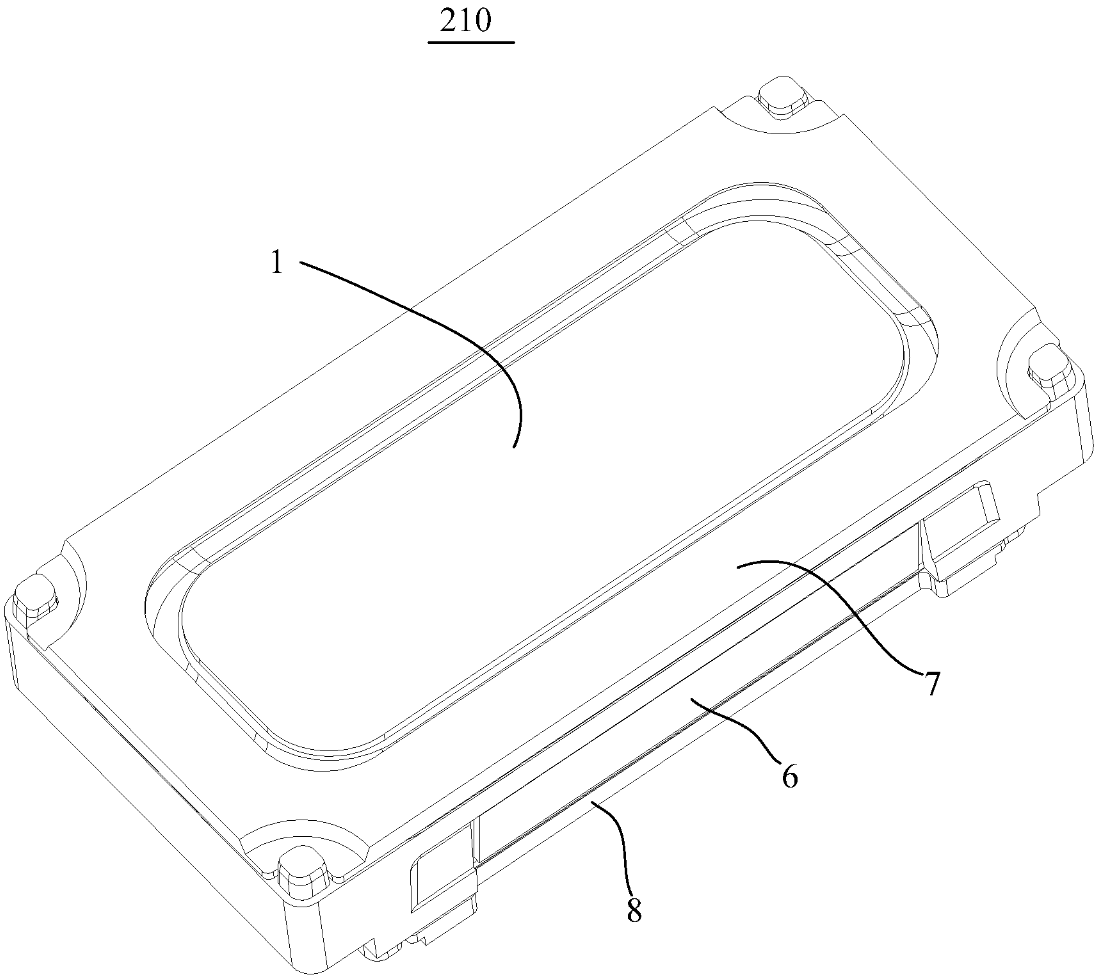
FIG. 1 is a schematic diagram of a front structure of a speaker according to a first embodiment of the present disclosure.
Figure 2:
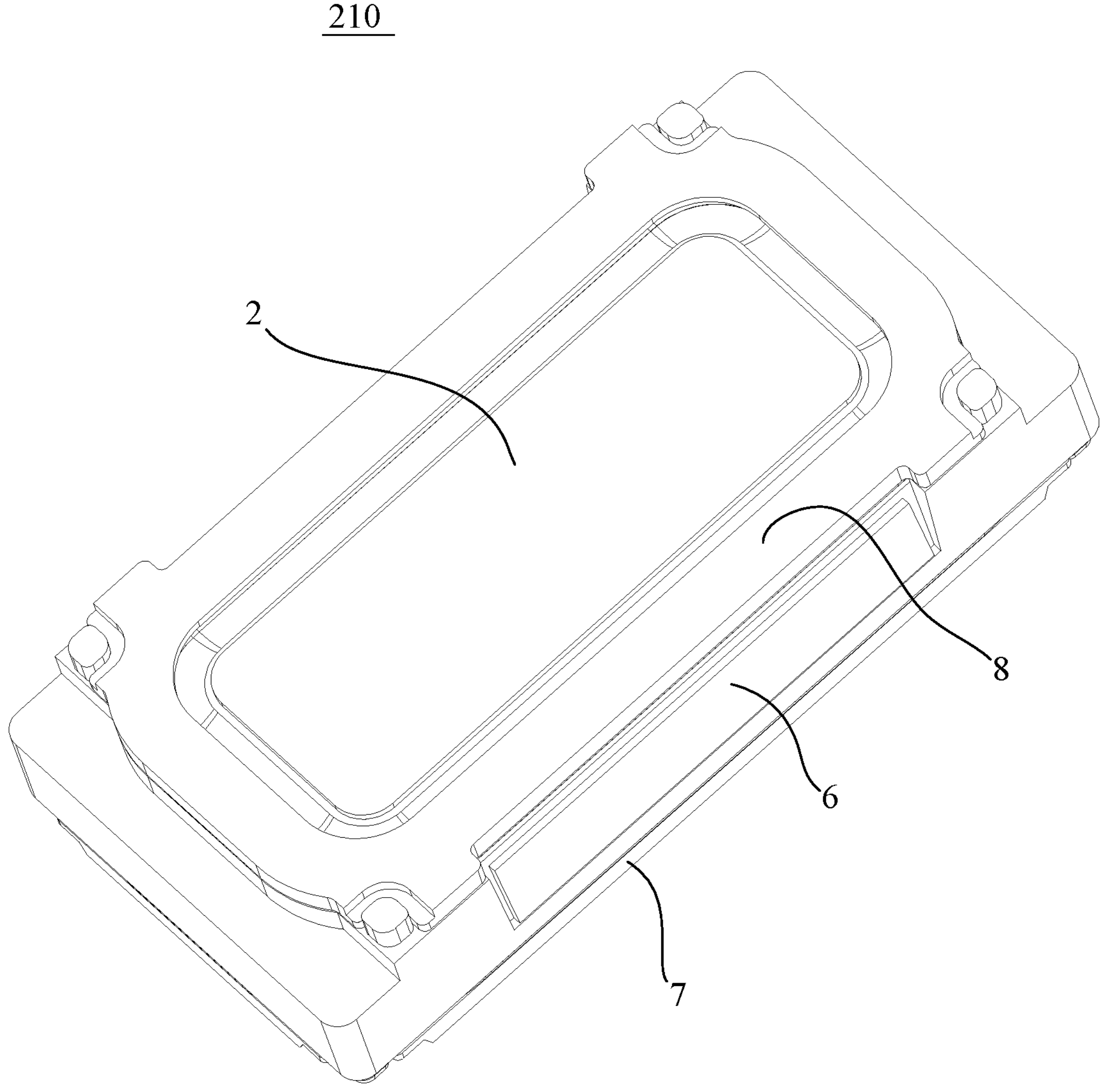
FIG. 2 is a schematic diagram of a back structure of the speaker in FIG. 1.

The realization of the objects, functional characteristics and advantages of this disclosure will be further described in conjunction with the embodiments and with reference to the drawings.

DETAILED DESCRIPTION OF THE EMBODIMENTS

In the following, the technical solutions in the embodiments of the present disclosure will be clearly and completely described with reference to the drawings in the embodiments of the present disclosure. Obviously, the described embodiments are only a part of the embodiments of the present disclosure, but not all of the embodiments. Based on the embodiments of the present disclosure, all other embodiments obtained by those of ordinary skill in the art without creative efforts shall fall within the protection scope of the present disclosure.

It should be noted that all directional indicators (such as up, down, left, right, front, back, etc.) in the embodiments of the present disclosure are only used to explain the relative positional relationship, movement situation, etc. between components in a specific posture (as shown in the drawings). If the specific posture changes, the directional indication also changes accordingly.

Embodiment 1

The present disclosure provides a speaker. Please refer to FIG. 1 to FIG. 6. In an embodiment, the speaker 210 includes:

an active vibrating unit 1, including a first vibrating diaphragm 11 and a voice coil 12 arranged inside the first vibrating diaphragm 11;

a passive vibrating unit 2, including a second vibrating diaphragm 21 disposed opposite to the first vibrating diaphragm 11; and a magnetic circuit system 3, arranged between the first vibrating diaphragm 11 and the second vibrating diaphragm 21, a first acoustic cavity 4 is defined between the magnetic circuit system 3 and the first vibrating diaphragm 11, and the voice coil 12 is accommodated in a magnetic gap 31 of the magnetic circuit system 3; a second acoustic cavity 5 is defined between the magnetic circuit system 3 and the second vibrating diaphragm 21, and the magnetic circuit system 3 defines an air guide hole 32 communicating the first acoustic cavity 4 and the second acoustic cavity 5.

In this embodiment, in order to simplify the description, a position when the first vibrating diaphragm 11 of the speaker 210 is placed upward is taken as a reference to define upper and lower positions, that is, a side of the first vibrating diaphragm 11 facing away from the magnetic circuit system 3 is an upper side, and a side of the first vibrating diaphragm 11 facing the magnetic circuit system 3 is an lower side.

The active vibrating unit 1 can refer to the existing structure. Specifically, the voice coil 12 is fixedly connected to the first vibrating diaphragm 11 and extends into the magnetic gap 31. The changing current of the voice coil 12 is vibrated by ampere force, and the voice coil 12 vibrates to drive the first vibrating diaphragm 11 to vibrate, and its energy conversion manner is electrical energy-mechanical energy-sound energy. In order to adjust the frequency characteristics of the vibration, the active vibrating unit 1 may further include a counterweight.

The magnetic circuit system 3 can also refer to the existing structure. For example, the magnetic gap 31 can be defined between a central magnetic steel 34 and a side magnetic steel, or between the central magnetic steel 34 and a side wall of a magnetic yoke 33. A shape of the central magnetic steel 34 in plan view may be circular or rectangular with rounded corners.

Figure 3:
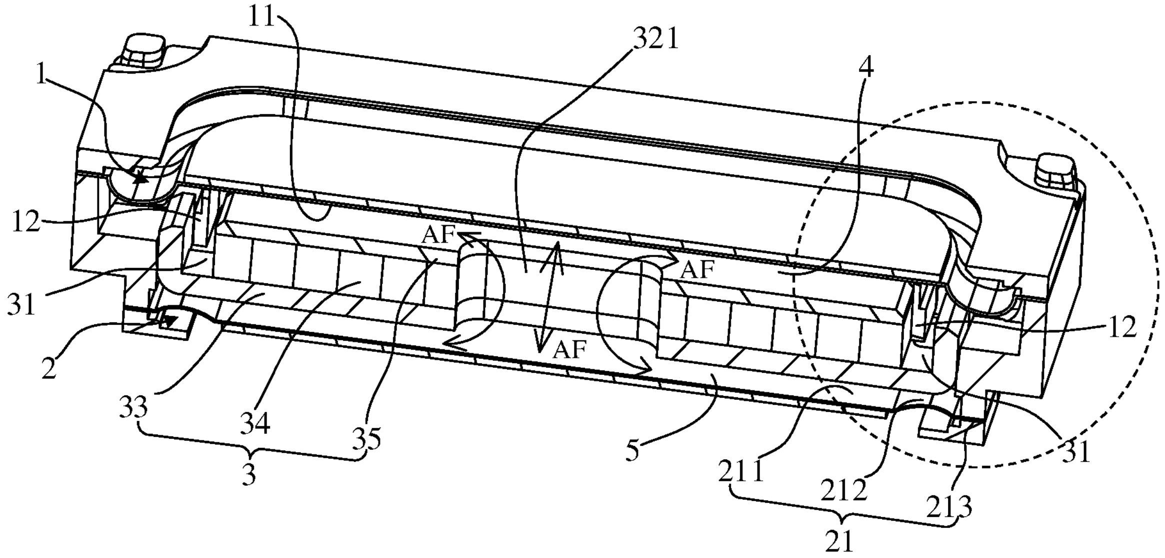
FIG. 3 is a schematic cross-sectional structure view of the speaker in FIG. 1.
Figure 6:
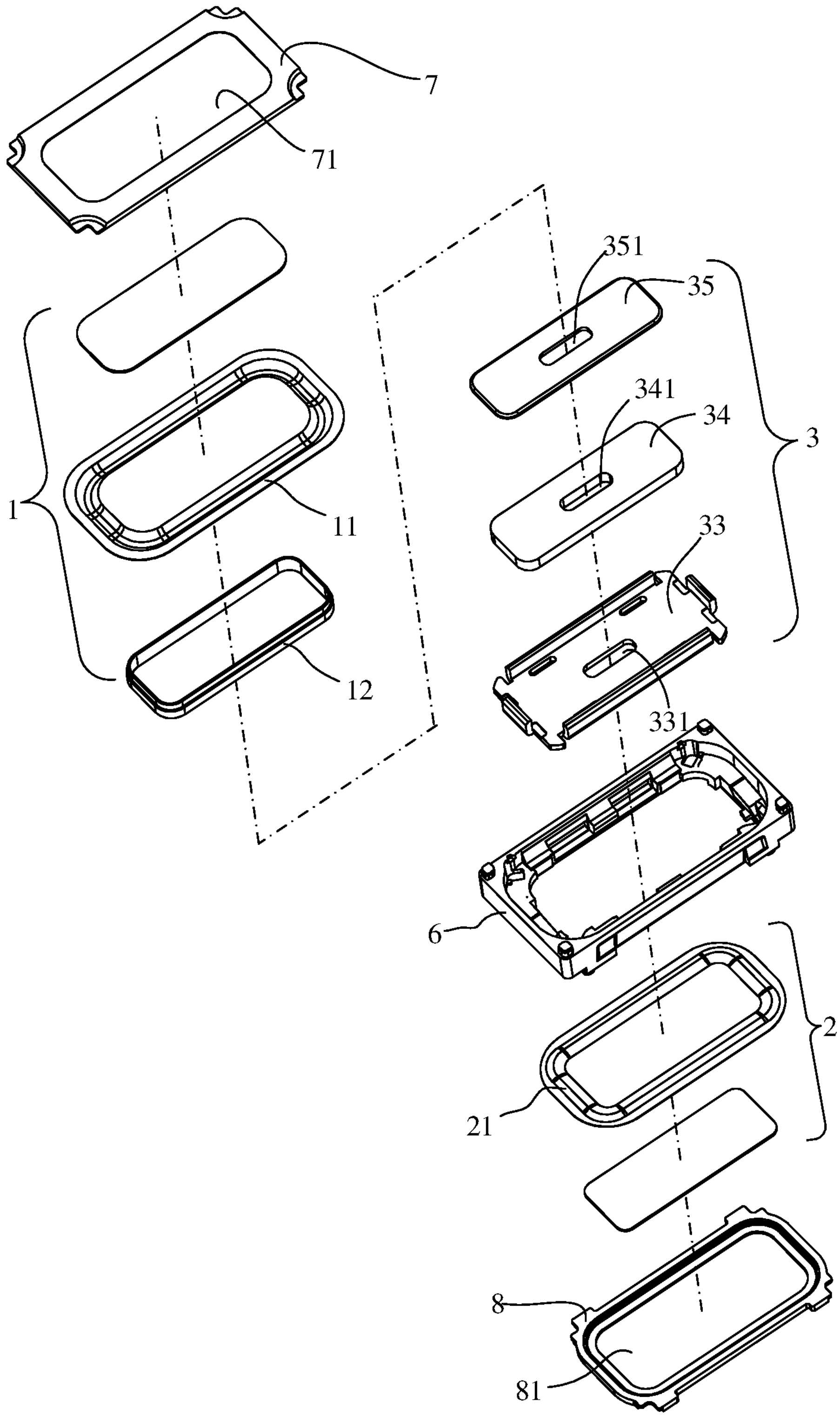
FIG. 6 is a schematic exploded diagram of the speaker in FIG. 1.

The air guide hole 32 can be defined only on a bottom wall of the magnetic yoke 33 to correspondingly communicate the magnetic gap 31 and the second acoustic cavity 5, or defined on a lateral side of the central magnetic steel 34 and bent downward in the central magnetic steel 34 to penetrate the bottom wall of the magnetic yoke 33, as long as the first acoustic cavity 4 and the second acoustic cavity 5 can be communicated, and a flow area of the air guide hole 32 is large enough to enable the airflow circulating in the air guide hole 32 to push the second vibrating diaphragm 21 to sound. The air guide hole 32 of this embodiment includes a central air guide hole 321 that penetrates a central position of the magnetic circuit system and a side air guide hole 322 that penetrates the bottom wall of the magnetic yoke 33. As shown in FIGS. 3 and 6, as an example, the airflow in the central air guide hole 321 is shown as AF in FIG. 3.

In order to facilitate the installation of the active vibrating unit 1, the passive vibrating unit 2 and the magnetic circuit system 3 between the two, the speaker 210 further includes a housing 6, a front cover 7 and a rear cover 8. The housing 6 is configured to house the active vibrating unit 1, the passive vibrating unit 2 and magnetic circuit system 3. The front cover 7 and the rear cover 8 cooperate with the housing 6 to form a protective frame. Specifically, an edge of the first vibrating diaphragm 11 for fixing is clamped by the front cover 7 and the housing 6, and an edge of the second vibrating diaphragm 21 for fixing is clamped by the rear cover 8 and the housing 6. The front cover 7 is provided corresponding to the active vibrating unit 1 and defines a front sound outlet 71 for sound emission, and the rear cover 8 is provided corresponding to the passive vibrating unit 2 and defines a rear sound hole 81 for sound emission.

The speaker 210 provided by the present disclosure is provided with two sets of vibration systems, but only one set of voice coil 12 and magnetic circuit system 3 is adopted to realize the bidirectional sounding structure, which occupies a small volume and is convenient to be widely used in portable terminals 100. When the speaker 210 of the present disclosure works, the magnetic circuit system 3 directly drives the diaphragm of the active vibrating unit 1, so that the air in the first acoustic cavity 4 is compressed or expanded, because the first acoustic cavity 4 and the second acoustic cavity 5 are communicated through the air guide hole 32, air circulates in the air guide hole 32. Driven by the airflow, the diaphragm of the passive vibrating unit 2 vibrates and produces sound, and the second acoustic cavity 5 expands or compresses in conjunction, so that a bidirectional sounding structure can be formed, in which the first vibrating diaphragm 11 on the front side radiates actively and the second vibrating diaphragm 21 on the opposite side radiates passively.

In this application, the magnetic circuit system as the driving structure only drives the first vibrating diaphragm 11 and the voice coil to work to drive the second vibrating diaphragm to vibrate synchronously and in the same direction, that is, only one set of driving structure is needed, and it does not need to be like a traditional structure in which it is necessary to respectively provide a driving structure corresponding to the first vibrating diaphragm and the second vibrating diaphragm, which is beneficial to reduce the size of the speaker. Preferably, the first vibrating diaphragm and the second vibrating diaphragm are arranged oppositely and in parallel. This structure facilitates ensuring the consistency of the vibration of the first vibrating diaphragm and the second vibrating diaphragm.

Figure 11:
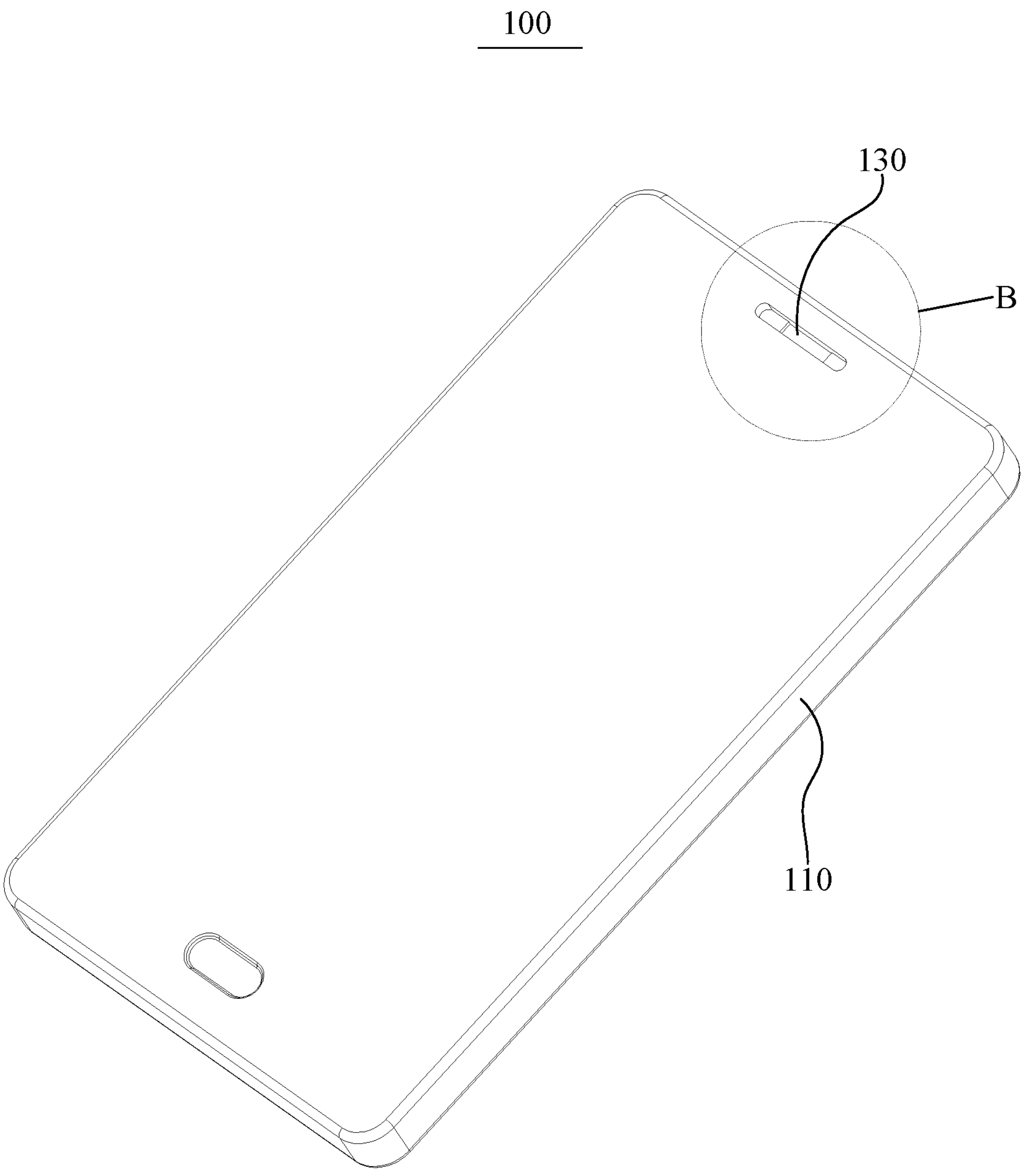
FIG. 11 is a schematic diagram of a front structure of a portable terminal according to an embodiment of the present disclosure.
Figure 12:
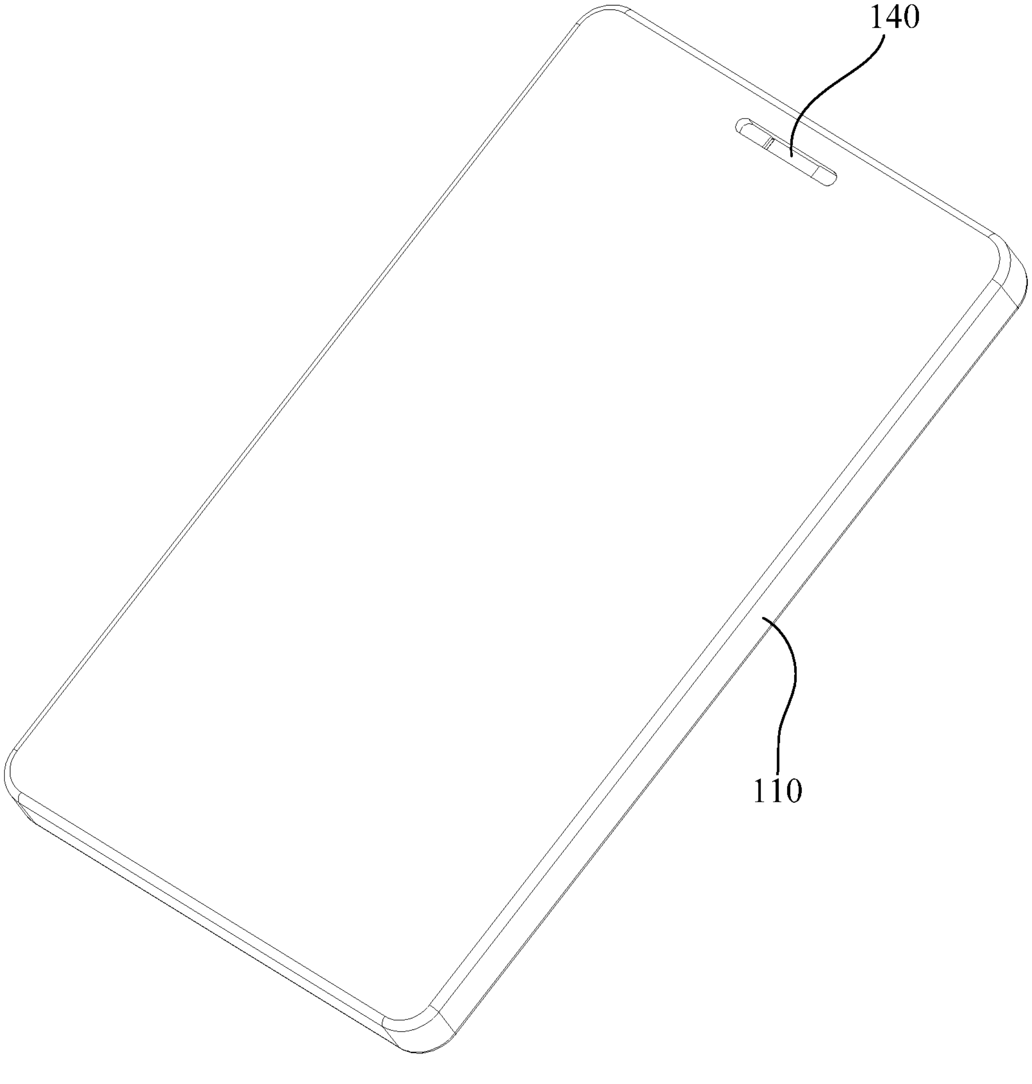
FIG. 12 is a schematic diagram of a back structure of the portable terminal in FIG. 11.
Figure 13:
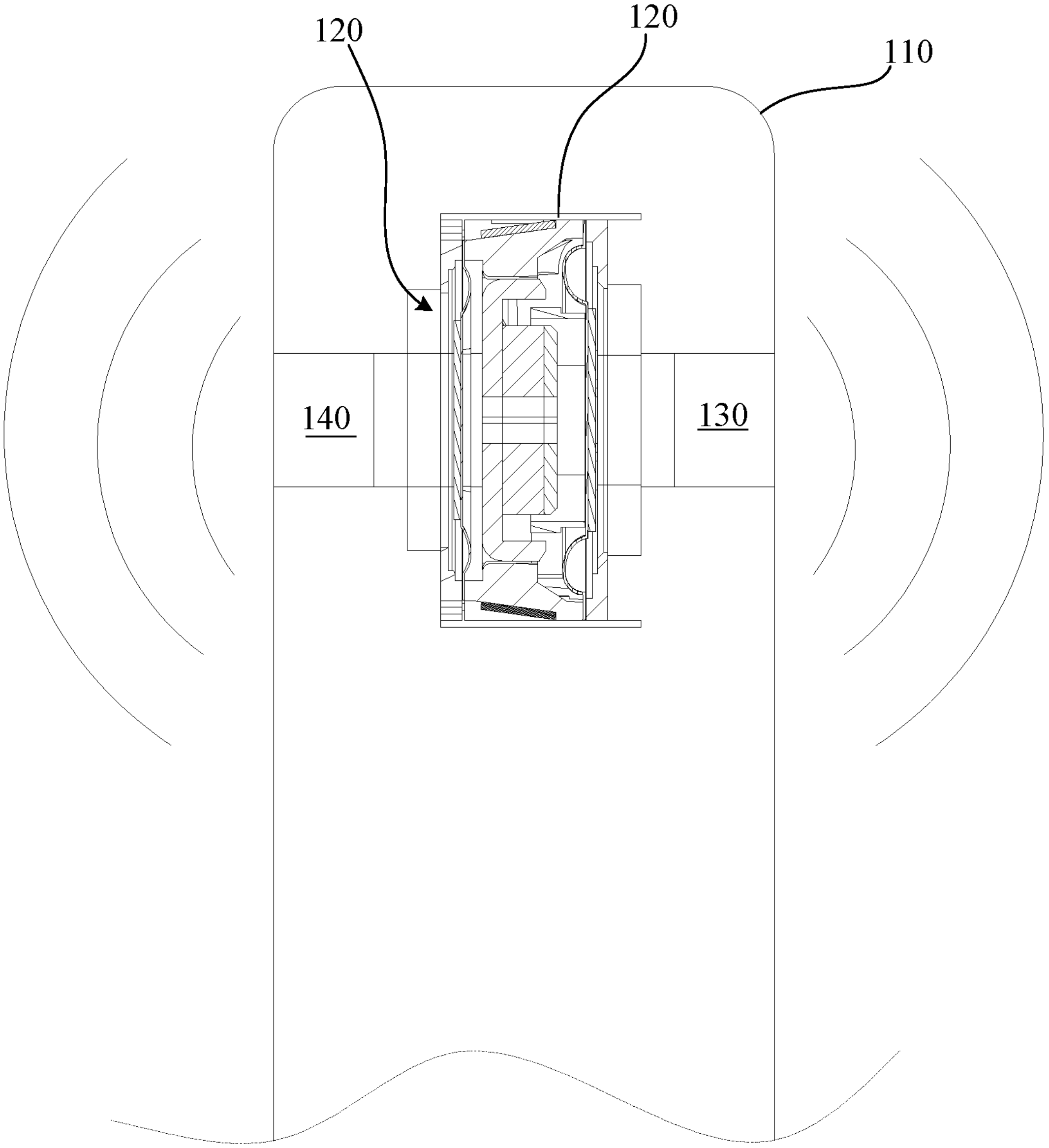
FIG. 13 is a partial cross-sectional view at B in FIG. 11.

When applied to a portable terminal 100, as shown in FIGS. 11 to 13, the speaker 210 of the present disclosure can respectively emit sound in the front and back directions of the portable terminal through the active vibrating unit 1 and the passive vibrating unit 2.

Further, the magnetic circuit system includes a magnetic yoke 33 and a central magnetic circuit portion and a side magnetic circuit portion (none of them are marked) provided on the magnetic yoke 33.

A magnetic gap 31 for accommodating the voice coil 12 is defined between the central magnetic circuit portion and the side magnetic circuit portion.

At least one of the central magnetic circuit portion and the side magnetic circuit portion is provided with a permanent magnet.

The air guide hole 32 includes a central air guide hole 321 corresponding to the central magnetic circuit portion of the magnetic yoke 33.

In this embodiment, since an amplitude of the central portion of the first vibrating diaphragm 11 is usually the largest, by arranging the central air guide hole 321 to correspond to the central portion of the first vibrating diaphragm 11, a larger amount of airflow can be transmitted, and the airflow can be better used to push the second vibrating diaphragm 21.

Further, the central magnetic circuit portion of the magnetic circuit system 3 includes a central magnetic steel 34 arranged at a bottom of the magnetic yoke 33, and a magnetic conductive plate 35 arranged on a top of the central magnetic steel 34.

The magnetic yoke 33 defines a first hole 331, the central magnetic steel 34 defines a second hole 341, and the magnetic yoke 33 defines a third hole 351. The first hole 331, the second hole 341 and the third hole 351 are communicated to form the central air guide hole 321.

In this embodiment, the central air guide hole 321 directly penetrates the magnetic yoke 33, the central magnetic steel 34 and the magnetic conductive plate 35, which has a simple structure and is beneficial to promote the air flow between the first acoustic cavity 4 and the second acoustic cavity 5.

Further, the air guide hole 32 further includes a side air guide hole 322 corresponding to the magnetic gap 31. In this embodiment, by defining the side air guide hole 322, combined with the central air guide hole 321, the connectivity between the first acoustic cavity 4 and the second acoustic cavity 5 is further increased, so that when the first vibrating diaphragm 11 vibrates, more air can flow between the first acoustic cavity 4 and the second acoustic cavity 5 within a period of time, and the second vibrating diaphragm 21 can also be driven to a greater extent.

It is understandable that at least one side air guide hole 322 is defined. In order to increase the flow area as much as possible, there are multiple side air guide holes 322 arranged at intervals along a circumferential direction of the magnetic gap 31. As such, it can not only ensure the balance of the communication but also make the magnetic circuit evenly communicated.

Preferably, the magnetic circuit system 3 includes a magnetic yoke 33, a central magnetic steel 34 arranged at a bottom of the magnetic yoke 33, and a magnetic conductive plate 35 arranged at a top of the central magnetic steel 34.

The magnetic yoke 33 defines a first hole 331, the central magnetic steel 34 defines a second hole 341, and the magnetic yoke 33 defines a third hole 351. The first hole 331, the second hole 341 and the third hole 351 are communicated to form the central air guide hole 321, and the side air guide holes 322 are defined at the bottom of the magnetic yoke 33. Since the bottom of the magnetic yoke 33 is closest to the second acoustic cavity 5 compared to the central magnetic steel 34 and the magnetic conductive plate 35, the side air holes 322 are defined at the bottom of the magnetic yoke 33 to be processed most conveniently.

Further, the first vibrating diaphragm 11, the second vibrating diaphragm 21 and the central magnetic steel 34 are all elongated, and long axes of the first vibrating diaphragm 11, the second vibrating diaphragm 21 and the central magnetic steel 34 are located in a same vertical plane, and the central air guide hole 321 extends along a length direction of the central magnetic steel 34.

In this embodiment, it can be understood that the vertical plane is a plane parallel to the up and down direction. Since the first vibrating diaphragm 11, the second vibrating diaphragm 21 and the central magnetic steel 34 are all elongated, correspondingly the speaker 210 is also elongated, and compared to a circular shape, this structure has a higher space utilization rate when applied to the portable terminal 100. At the same time, under the premise of the same area, the elongated first vibrating diaphragm 11 and the second vibrating diaphragm 21 are easier to obtain greater vibration. For the first vibrating diaphragm 11, a larger amount of air can be actively fanned, while the second vibrating diaphragm 21 is more easily propelled by the air flow flowing through the central air guide hole 321 and the side air guide holes 322.

Further, sound generated on a side of the first vibrating diaphragm 11 away from the second vibrating diaphragm 21 is received by the human ear, and sound generated on a side of the second vibrating diaphragm 21 away from the first vibrating diaphragm 11 is received by the human ear. In this embodiment, both the first vibrating diaphragm 11 and the second vibrating diaphragm 21 can generate sounds located in the human auditory sound range, for example, the frequency range is 20 to 20000 HZ. In this way, voice messages can be received directly from the front and back directions of the speaker. It is understandable that in other embodiments, the first vibrating diaphragm 11 and the second vibrating diaphragm 21 can also be configured to generate sounds in other frequency ranges, such as the "sound code" of the corresponding range of human hearing. This sound can be decoded by a machine to transmit the corresponding signal.

Figure 4:
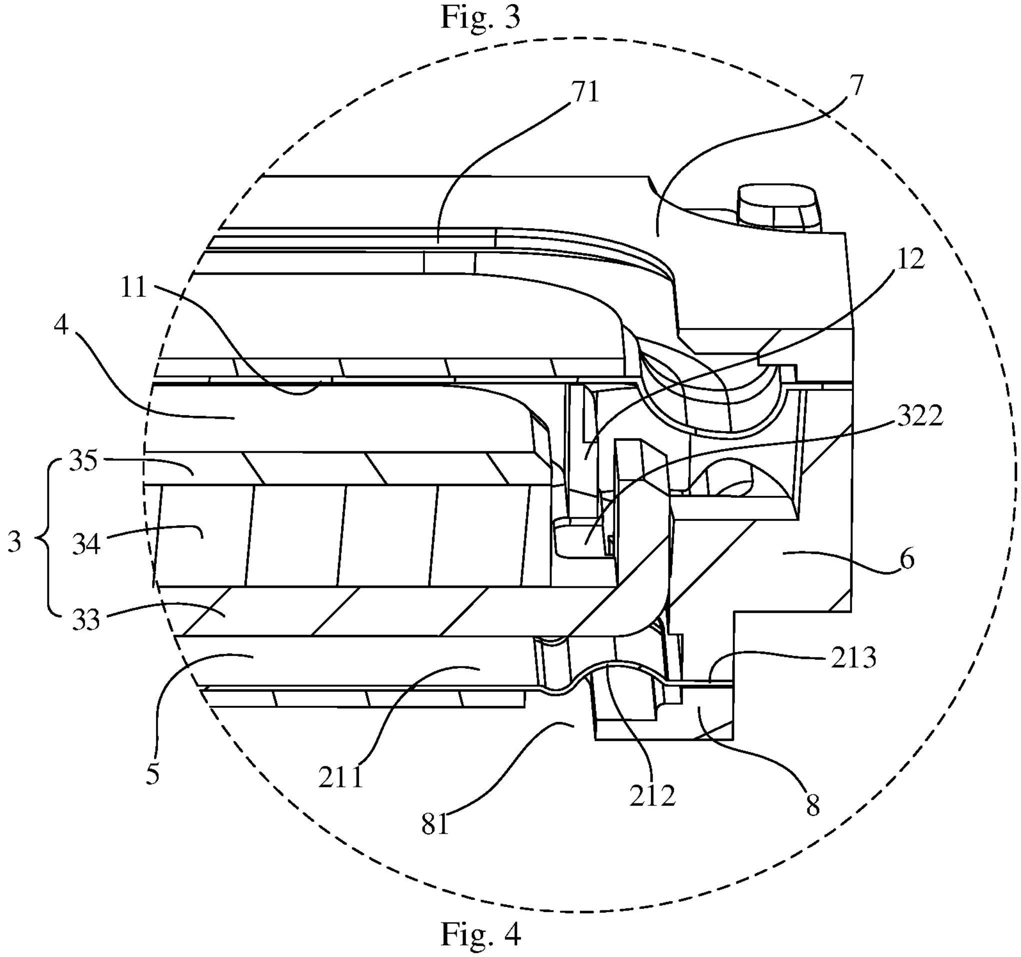
FIG. 4 is an enlarged schematic view of a right end of the structure in FIG. 3.
Figure 5:
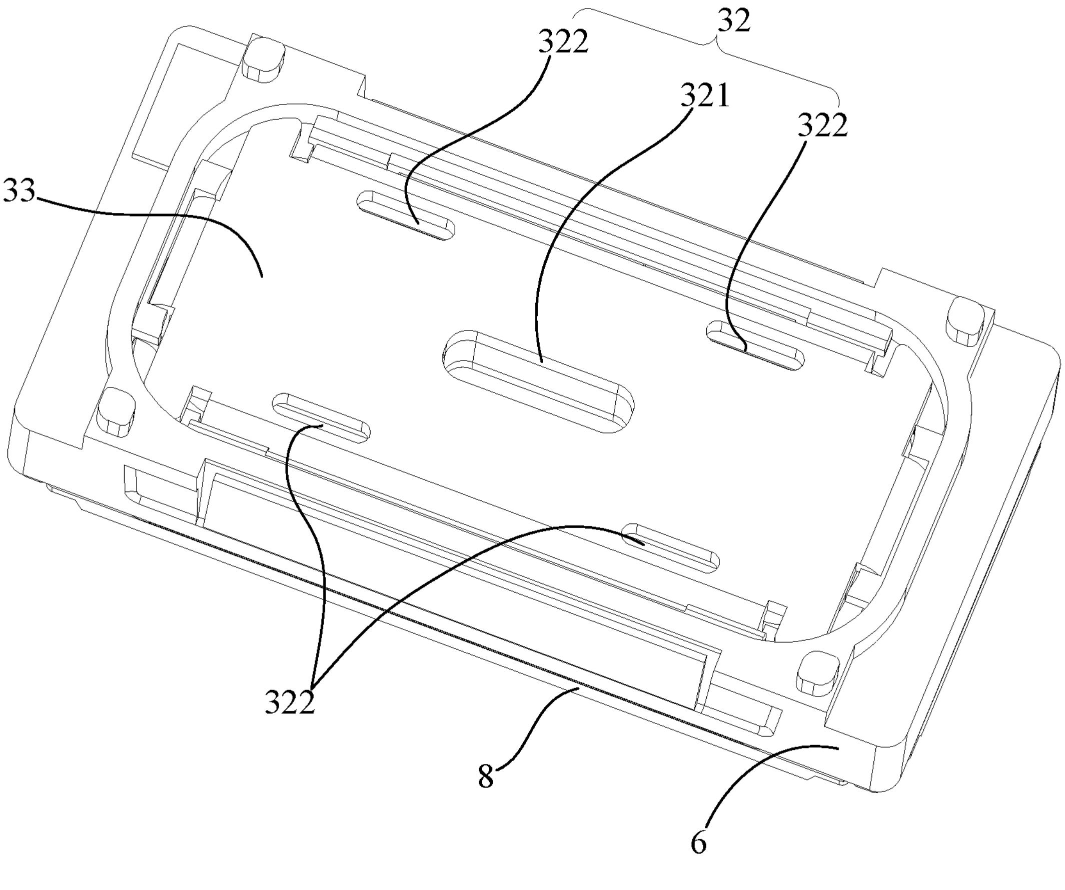
FIG. 5 is a schematic diagram of part of the speaker in FIG. 1.

Further, referring to FIG. 4, the second vibrating diaphragm 21 includes a central portion 211, a folding ring portion 212 arranged around the central portion 211, and a fixing portion 213 arranged around the folding ring portion 212. The central portion 211 is a flat sheet structure, and the folding ring portion 212 is a structure formed by a protrusion, or the folding ring portion 212 is a wave-shaped structure formed by at least one protrusion and at least one recess.

In this embodiment, the central portion 211 is configured to sense a density change of the air in the second acoustic cavity 5 and then vibrate to produce sound, that is, passively radiate sound. By setting the central portion 211 as a flat sheet structure, the second vibrating diaphragm 21 occupies a small space in the up and down direction and can generate a sufficiently large amplitude. The folding ring portion 212 provides a certain degree of compliance for the movement of the central portion 211, that is, provides a certain degree of flexibility, so that the central portion 211 is more easily pushed by the airflow flowing through the central air guide hole 321 and the side air guide holes 322.

Further, since the second vibrating diaphragm 21 produces sound through passive radiation, in order to ensure that the second vibrating diaphragm 21 is more easily pushed by the airflow, the second vibrating diaphragm 21 is made of a material with a relatively low elastic modulus. For example, if the first vibrating diaphragm 11 and the second vibrating diaphragm 21 both include a central portion, a folding ring portion arranged around the central portion, and a fixing portion arranged around the folding ring portion, that is, if the two diaphragms adopt the same structure, an elastic modulus of the central portion of the second vibrating diaphragm 21 is smaller than an elastic modulus of the central portion of the first vibrating diaphragm, and an elastic modulus of the second vibrating diaphragm 21 is smaller than an elastic modulus of the folding ring portion of the first vibrating diaphragm 11.

Further, the first vibrating diaphragm 11 includes a central portion, a folding ring portion arranged around the central portion, and a fixing portion arranged around the folding ring portion. The central portion of the first vibrating diaphragm 11 has a flat sheet structure. Similarly, by arranging the central portion of the first vibrating diaphragm 11 as a flat sheet structure, the first vibrating diaphragm 11 occupies a small space in the up and down direction and can generate a sufficiently large amplitude. After combining with the embodiment in which the central portion of the second vibrating diaphragm 21 is also provided as a sheet structure, the speaker provided by the present disclosure has a thin structure in the up and down direction as a whole, so that it is easier to apply to a flat installation space.

Embodiment 2

Figure 7:
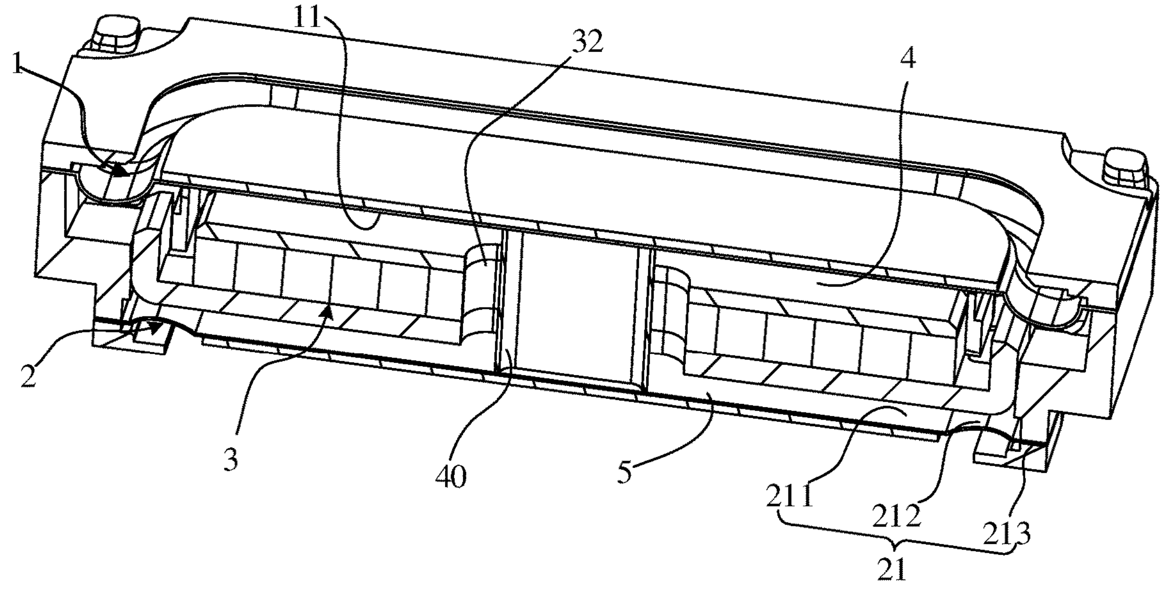
FIG. 7 is a schematic structural diagram of the speaker according to a second embodiment of the present disclosure.

As shown in FIG. 7, this embodiment is further provided with a transmission structure on the basis of the first embodiment, and the first vibrating diaphragm 11 transmits vibration to the second vibrating diaphragm 21 through the transmission structure. The transmission structure of this embodiment is a connector 40, which is a cylindrical structure with open upper and lower ends and arranged in the air guide hole 32. The air guide hole 32 of this embodiment is defined at a middle of the magnetic circuit system 3. An upper end of the connector 40 is fixedly connected to the first vibrating diaphragm 11, and a lower end of the connector 40 is fixedly connected to the second vibrating diaphragm 21.

The connector 40 may be connected to the first vibrating diaphragm 11 or the second vibrating diaphragm 21 by glue bonding or integral injection molding.

In this embodiment, the connector 40 penetrating the air guide hole is provided. The connector 40 connects the first vibrating diaphragm 11 and the second vibrating diaphragm 21 at the same time, which is more conducive to ensuring the linkage sound of the first vibrating diaphragm 11 and the second vibrating diaphragm 21, thus ensuring their synchronized and codirectional motion.

By arranging the connector 40 into a cylindrical structure, the structural strength during transmission can be ensured, and the energy loss can be reduced by reducing the mass. The transmission of the connector 40 refers to pushing or pulling the second vibrating diaphragm 21 with the first vibrating diaphragm 11 as a reference.

Figure 8:
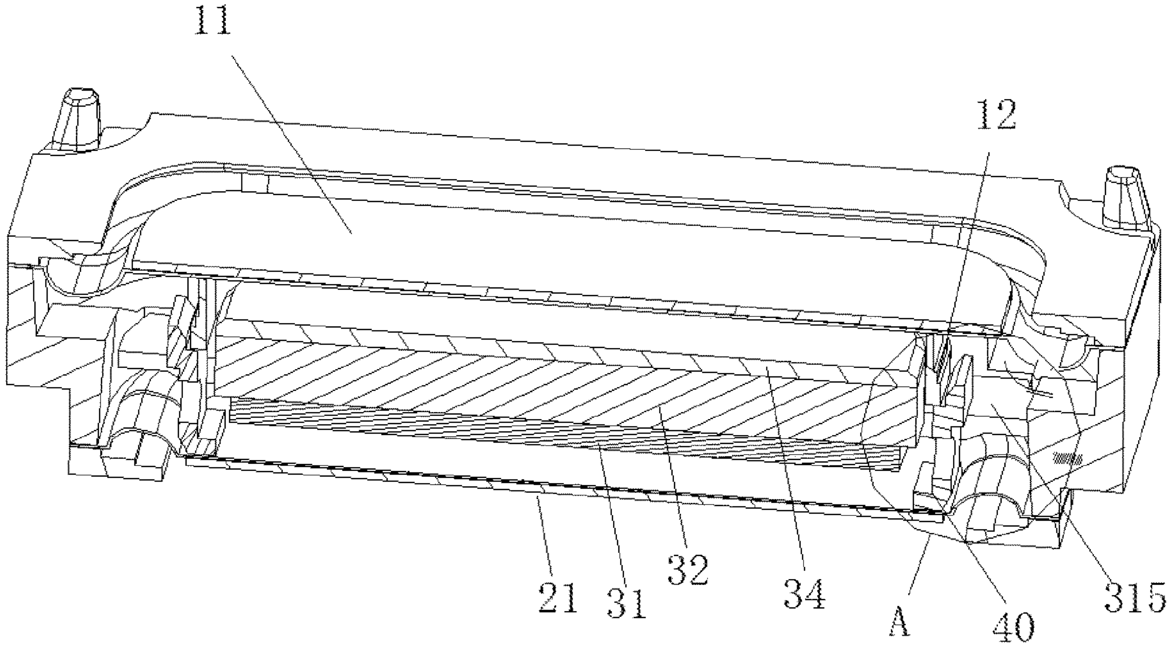
FIG. 8 is a schematic diagram of another improved structure of the speaker according to the second embodiment of the present disclosure.
Figure 9:
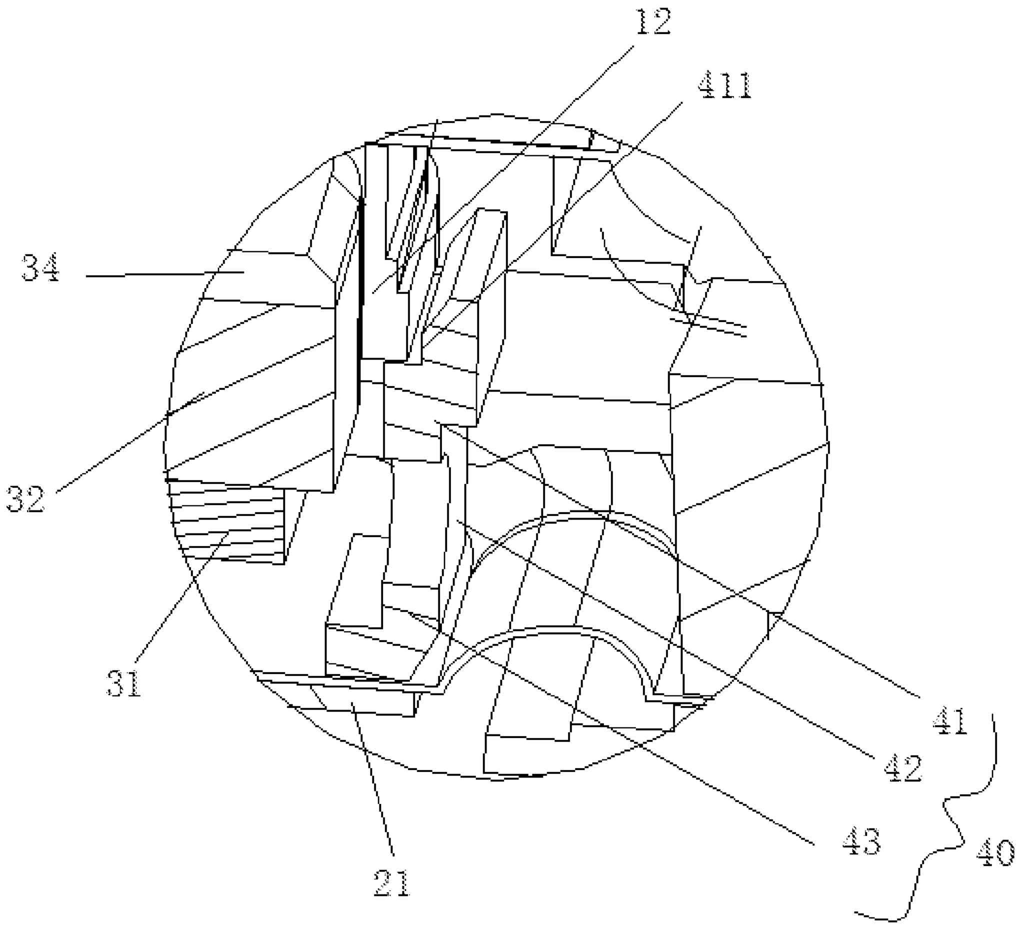
FIG. 9 is a partial enlarged view of FIG. 8.

In another preferred embodiment, as shown in FIG. 8 and FIG. 9, at this time, the connector 40 passes through the air guide hole to be connected to the second vibrating diaphragm 21. In this way, one end of the connector 40 is connected to the voice coil 12, and the other end of the connector 40 passes through the air guide hole to be connected to the second vibrating diaphragm 21, so that when the voice coil 12 vibrates, the voice coil 12 can not only drive the first vibrating diaphragm 11 to vibrate, but also drive the connector 40 to vibrate to further drive the second vibrating diaphragm 21 to vibrate, so that while the first vibrating diaphragm 11 vibrates and produces sound, the second vibrating diaphragm 21 is linked to produce sound.

The magnetic yoke 31 of this embodiment has an approximate rectangular shape as a whole. The central magnetic circuit portion and the side magnetic circuit portions are elongated. The central magnetic circuit portion specifically includes a central magnetic steel 32 and a central magnetic conductive plate 34 covering on the central magnetic steel 32, the side magnetic circuit portion includes a sub-magnetic steel and a side magnetic conductive plate installed on the sub-magnetic steel. The voice coil 12 is also enclosed in an approximately rectangular parallelepiped shape with round corners. Two side magnetic circuit portions and a central magnetic circuit portion forms a triple-magnetic circuit system. The two short sides of the magnetic yoke 31 are both provided with the air guide hole 315, each air guide hole 315 is movably provided with a connector 40, and the two connectors 40 are correspondingly connected to the two short sides of the voice coil 12 respectively. In this way, during the working process of the speaker, the two opposite short sides of the voice coil 12 act on the second vibrating diaphragm 21 at the same time through the connectors 40, and the second vibrating diaphragm 21 receives more uniform force, and the synchronous motion with the first diaphragm 11 is more consistent. The sound quality of bidirectional sounding of the speaker is better.

Further, the connector includes an upper connecting portion 41 and a lower connecting portion 43 oppositely arranged up and down, and a support portion 42 connected between the upper connecting portion 41 and the lower connecting portion 43, where the upper connecting portion 41 and the lower connecting portion 43 are both extended along the short sides, that is, extended up and down perpendicular to the vibrating diaphragm and are both in a long strip shape, the upper connecting portion 41 is fixedly connected to the voice coil 12, and the lower connecting portion 42 is fixedly connected to the second vibrating diaphragm 21. The upper connecting portion 41 is further provided with a stepped fixing portion 411, and the fixing portion 411 is configured for cooperating and fixing with the voice coil, so as to facilitate the firm combination of the voice coil and the connector 40.

In addition, the connector may also be a voice coil bobbin. That is, the voice coil assembly may be a bobbin voice coil, including a bobbin and a voice coil body formed by winding a voice coil lead on the bobbin, one end of the bobbin is fixedly connected to the first vibrating diaphragm, and an end of the bobbin far away from the first vibrating diaphragm is movably passed through the air guide hole to be fixedly connected to the second vibrating diaphragm; and the connector is the bobbin, and the bobbin is passed through the air guide hole to be fixedly connected to the first vibrating diaphragm and the second vibrating diaphragm.

The magnetic circuit system includes two oppositely arranged long sides and two oppositely arranged short sides, and defines one air guide hole at a position corresponding to each short side respectively. Correspondingly, the bobbin also includes two portions arranged on the short axis, so that the first vibrating diaphragm and the second vibrating diaphragm can vibrate in balance.

Embodiment 3

In this embodiment, the transmission structure is provided on the vibrating unit, that is, the first vibrating diaphragm or the voice coil is fixedly connected to the second vibrating diaphragm. Specifically, a part of the first vibrating diaphragm or the voice coil is fixedly connected to a part of the second vibrating diaphragm.

Figure 10:
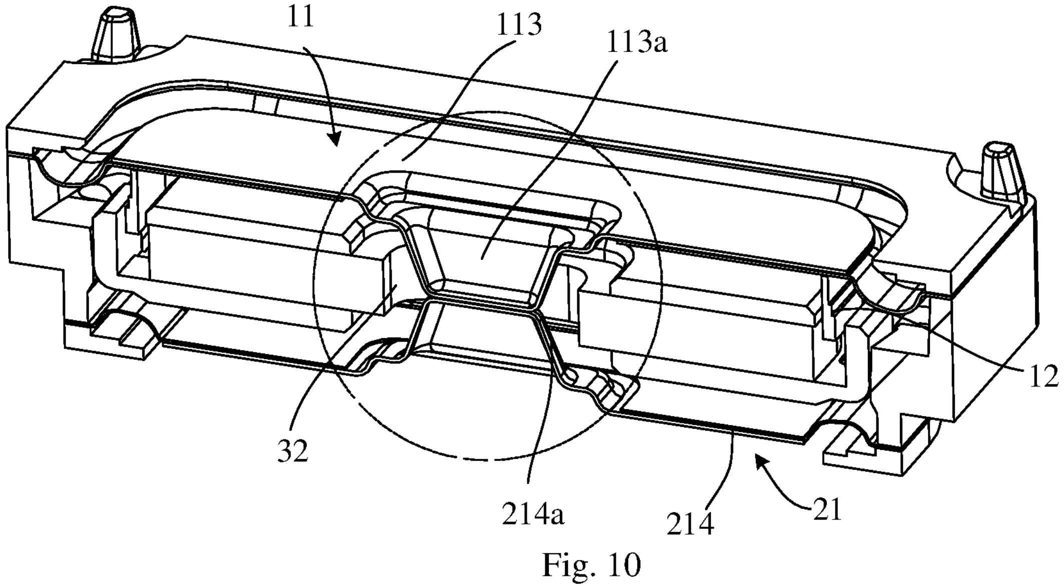
FIG. 10 is a schematic structural diagram of the speaker according to a third embodiment of the present disclosure.

As shown in FIG. 10, at least one of a first central portion of the first vibrating diaphragm 11 and a second central portion of the second vibrating diaphragm 21 is inserted into the air guide hole, and the first central portion and the second central portion are fixedly connected. Since the first central portion of the first vibrating diaphragm 11 is fixedly connected to the second central portion of the second vibrating diaphragm 21, when the first vibrating diaphragm 11 vibrates, the first central portion will drive the second central portion of the second vibrating diaphragm 21 to vibrate, thereby driving the second vibrating diaphragm 21 to vibrate, which can cause the second vibrating diaphragm 21 to instigate air to produce sound, thereby realizing linked sound production.

In order to facilitate batch processing, the first central portion 113 of the first vibrating diaphragm 11 and the second central portion 214 of the second vibrating diaphragm 21 are both provided with portions extending into the air guide holes 32. The first central portion 113 includes a first protrusion **113*a* extending into the air guiding hole 32, and the second central portion 214 includes a second protrusion 214*a* extending into the air guiding hole 32, and the first protrusion 113*a* and the second protrusion 214*a* are fixedly connected in the air guiding hole 32**.

In this embodiment, the first protrusion **113*a* is formed by directly protruding from the first central portion 113, and the interior of the first protrusion 113*a* is hollow. This structure can not only ensure the structural strength during transmission, but also reduce energy loss by reducing mass, so that the vibration transmitted by the first protrusion 113*a* can be more significant, and the high frequency performance of the speaker device can be improved. The second protrusion 214*a* has the same structure as the first protrusion 113*a***, which facilitates processing and improves production efficiency.

As an improvement of this embodiment, the magnetic circuit system defines the air guide hole at a position corresponding to the voice coil assembly, the second vibrating diaphragm includes a central portion, and the central portion includes an extension portion extending toward the voice coil assembly; and the extension portion is passed through the air guide hole to be fixed to the voice coil assembly. The linkage sound of the first vibrating diaphragm and the second vibrating diaphragm is realized by the extension portion.

As another improvement of this embodiment, the second vibrating diaphragm includes a central portion; the central portion includes an extension portion extending in a direction close to the first vibrating diaphragm, and the magnetic circuit system defines the air guide hole at a position corresponding to the extension portion; and the extension portion is passed through the air guide hole to be fixed to the first vibrating diaphragm. That is, the first vibrating diaphragm and the second vibrating diaphragm are fixedly connected only by the integrally formed extension portion of the second vibrating diaphragm, so as to realize the linkage sound.

The present disclosure further provides a portable terminal 100. Please refer to FIGS. 11 to 13. The portable terminal 100 includes a housing 110 with an accommodating cavity 120 inside the housing 110. The portable terminal 100 further includes a speaker 210. Specific structure of the speaker 210 may refer to the foregoing embodiments. Since the portable terminal 100 adopts all the technical solutions of all the above embodiments, it at least has all the beneficial effects brought by the technical solutions of the foregoing embodiments, which are not described in detail here again. The speaker 210 is installed in the accommodating cavity 120, and the housing 110 defines a first acoustic hole 130 corresponding to the first vibrating diaphragm 11, and a second acoustic hole 140 corresponding to the second vibrating diaphragm (21, 21*b*, 21*c*). Preferably, in order to shorten the propagation path of sound inside the housing 110 and reduce the acoustic resistance, the first acoustic hole 130 is defined in the housing 110 at a position directly opposite to the first vibrating diaphragm 11, and the second acoustic hole 140 is defined in the housing 110 at a position directly opposite to the second vibrating diaphragm 21.

The above is only preferable embodiments of this disclosure, and thus does not limit the scope of this disclosure, and the equivalent structural transformation made by the content of the specification and the drawings of this disclosure, or directly/indirectly applied to other related technical fields are all included in the patent protection scope of this disclosure.

What is claimed is:

1. A speaker, comprising:

an active vibrating unit, comprising a first vibrating diaphragm vibrating for radiating a sound, and a voice coil assembly for fixing and driving the first vibrating diaphragm;

a passive vibrating unit, comprising a second vibrating diaphragm and driven by the first vibrating diaphragm to vibrate; and a magnetic circuit system, acting with the voice coil assembly to drive the first vibrating diaphragm of the active vibrating unit to vibrate, wherein the magnetic circuit system is arranged between the first vibrating diaphragm and the second vibrating diaphragm, a first acoustic cavity is defined between the magnetic circuit system and the first vibrating diaphragm, and a second acoustic cavity is defined between the magnetic circuit system and the second vibrating diaphragm;

wherein the magnetic circuit system defines an air guide hole communicating the first acoustic cavity and the second acoustic cavity;

the magnetic circuit system further comprises a transmission structure, wherein a vibration is transmitted by the active vibrating unit to the passive vibrating unit through the transmission structure;

the transmission structure is a connector arranged in the air guide hole, an upper end of the connector is fixedly connected to the first vibrating diaphragm or the voice coil assembly, and a lower end of the connector is fixedly connected to the second vibrating diaphragm;

the magnetic circuit system comprises two oppositely arranged long sides and two oppositely arranged short sides, and defines one air guide hole at a position corresponding to each short side respectively;

the active vibrating unit comprises a bobbin voice coil comprising a bobbin and a voice coil body formed by winding a voice coil lead on the bobbin, one end of the bobbin is fixedly connected to the first vibrating diaphragm, and an end of the bobbin far away from the first vibrating diaphragm is movably passed through the air guide hole to be fixedly connected to the second vibrating diaphragm; and the connector is the bobbin, and the bobbin is passed through the air guide hole to be fixedly connected to the first vibrating diaphragm and the second vibrating diaphragm.

2. A portable terminal using the speaker as recited in claim 1, wherein a housing of the portable terminal defines two sound holes corresponding to sound radiation areas of the first vibrating diaphragm and the second vibrating diaphragm of the speaker.

3. The portable terminal of claim 2, wherein the housing comprises a front and a back arranged oppositely, a first sound hole is defined on the front of the housing, and a second sound hole is defined on the back of the housing; a space where the first vibrating diaphragm away from the second vibrating diaphragm is communicated with the first sound hole, and the first sound hole is configured for conducting a sound emitted by the first vibrating diaphragm; a space where the second vibrating diaphragm away from the first vibrating diaphragm is communicated with the second sound hole, and the second sound hole is configured for conducting a sound emitted by the second vibrating diaphragm.

4. A speaker, comprising:

an active vibrating unit, comprising a first vibrating diaphragm vibrating for radiating a sound, and a voice coil assembly for fixing and driving the first vibrating diaphragm;

a passive vibrating unit, comprising a second vibrating diaphragm and driven by the first vibrating diaphragm to vibrate; and a magnetic circuit system, acting with the voice coil assembly to drive the first vibrating diaphragm of the active vibrating unit to vibrate, wherein the magnetic circuit system is arranged between the first vibrating diaphragm and the second vibrating diaphragm, a first acoustic cavity is defined between the magnetic circuit system and the first vibrating diaphragm, and a second acoustic cavity is defined between the magnetic circuit system and the second vibrating diaphragm, wherein the magnetic circuit system defines an air guide hole communicating the first acoustic cavity and the second acoustic cavity; and the magnetic circuit system further comprises a transmission structure, wherein a vibration is transmitted by the active vibrating unit to the passive vibrating unit through the transmission structure;

the transmission structure is arranged between the active vibrating unit and the passive vibrating unit, and the first vibrating diaphragm or the voice coil assembly of the active vibrating unit is rigidly connected to the second vibrating diaphragm of the passive vibrating unit;

the first vibrating diaphragm comprises a first central portion;

the second vibrating diaphragm comprises a second central portion; and the first central portion comprises a first protrusion extending into the air guide hole, the second central portion comprises a second protrusion extending into the air guide hole, and the first protrusion and the second protrusion are fixedly connected in the air guide hole.

5. A portable terminal using the speaker as recited in claim 4, wherein a housing of the portable terminal defines two sound holes corresponding to sound radiation areas of the first vibrating diaphragm and the second vibrating diaphragm of the speaker.

6. A speaker, comprising:

an active vibrating unit, comprising a first vibrating diaphragm vibrating for radiating a sound, and a voice coil assembly for fixing and driving the first vibrating diaphragm;

a passive vibrating unit, comprising a second vibrating diaphragm and driven by the first vibrating diaphragm to vibrate; and a magnetic circuit system, acting with the voice coil assembly to drive the first vibrating diaphragm of the active vibrating unit to vibrate, wherein the magnetic circuit system is arranged between the first vibrating diaphragm and the second vibrating diaphragm, a first acoustic cavity is defined between the magnetic circuit system and the first vibrating diaphragm, and a second acoustic cavity is defined between the magnetic circuit system and the second vibrating diaphragm, wherein the magnetic circuit system defines an air guide hole communicating the first acoustic cavity and the second acoustic cavity; and the magnetic circuit system further comprises a transmission structure, wherein a vibration is transmitted by the active vibrating unit to the passive vibrating unit through the transmission structure;

the transmission structure is arranged between the active vibrating unit and the passive vibrating unit, and the first vibrating diaphragm or the voice coil assembly of the active vibrating unit is rigidly connected to the second vibrating diaphragm of the passive vibrating unit;

the magnetic circuit system defines the air guide hole at a position corresponding to the voice coil assembly, the second vibrating diaphragm comprises a central portion, and the central portion comprises an extension portion extending toward the voice coil assembly; and the extension portion is passed through the air guide hole to be fixed to the voice coil assembly.

7. A portable terminal using the speaker as recited in claim 6, wherein a housing of the portable terminal defines two sound holes corresponding to sound radiation areas of the first vibrating diaphragm and the second vibrating diaphragm of the speaker.

* * * * *